(12) United States Patent
Lim

(10) Patent No.: US 6,740,181 B1
(45) Date of Patent: May 25, 2004

(54) APPARATUS FOR MANUFACTURING CLEANING PAD

(76) Inventor: Young-Chul Lim, 217-38, Sungbuk-dong, Sungbuk-gu, Seoul, 136-020 (KR)

( * ) Notice: Subject to any disclaimer, the term of this patent is extended or adjusted under 35 U.S.C. 154(b) by 0 days.

(21) Appl. No.: 10/301,177

(22) Filed: Nov. 20, 2002

(51) Int. Cl.⁷ ............................................. B32B 31/16
(52) U.S. Cl. ...................... 156/73.3; 156/515; 156/530; 156/580.1; 156/580.2
(58) Field of Search ............................... 156/73.1, 73.3, 156/269, 290, 308.2, 308.4, 510, 515, 530, 580.1, 580.2

(56) References Cited

U.S. PATENT DOCUMENTS

| | | | | |
|---|---|---|---|---|
| 4,052,238 A | * | 10/1977 | Botvin | 156/148 |
| 4,168,863 A | * | 9/1979 | Hatcher | 300/21 |
| 4,287,633 A | * | 9/1981 | Gropper | 15/229.11 |
| 5,441,333 A | * | 8/1995 | Kim | 300/21 |
| 5,843,256 A | | 12/1998 | Han | 156/73.1 |

* cited by examiner

Primary Examiner—James Sells
(74) Attorney, Agent, or Firm—Cantor Colburn LLP

(57) ABSTRACT

An apparatus for manufacturing cleaning pads is provided including a base, a pair of supply plates mounted over the base, a supporting plate protruded from an end of the supply plate, a lifting plate located on both sides of the supporting plate, an ultrasonic horn with a groove formed in a bottom being vertically movable located over the supporting plate and driven by an ultrasonic oscillator, an actuator mounted on both sides of the ultrasonic horn to help the ultrasonic horn separate from the cleaning pad, a moving body located under the supporting plate and being movable along a guide rail, a rotary blade mounted on an upper end of the moving body, an air cylinder for moving the moving body, and an inhaler to draw off broken pieces of the cleaning pad, wherein the actuator includes a case mounted on a side of the ultrasonic horn, a press member being vertically slidable in the case, a bottom of which is movable lower than that of the ultrasonic horn, and a spring located in the case to downwardly compress the press member.

5 Claims, 4 Drawing Sheets

APPARATUS FOR MANUFACTURING CLEANING PAD

BACKGROUND OF THE INVENTION

1. Field of the Invention

This invention relates to an apparatus for manufacturing a cleaning pad, more particularly to an apparatus for manufacturing a cleaning pad including a cover knitted out of polyester film and synthetic fiber, and a sponge inserted into the cover by bonding the pad using ultrasonic waves and then cutting the bonded pad.

2. Description of the Related Art

Cleaning pads made of synthetic fibers are commonly used for washing dishes, bowls and the like. The conventional method of making cleaning pads comprises sewing a cleaning pad that is a cover knitted from polyurethane fiber or the like with a sponge therein. This method has defects in that the sewed portion of the cleaning pad is easily broken and the cleaning pads are easily damaged during the sewing process. Also, the method is not suitable for mass production of the cleaning pads.

To overcome the above defects, U.S. Pat. No. 5,843,256 proposed a method of making cleaning pads, which makes mass production of the cleaning pads possible.

The patent discloses a method of making cleaning pads including compressing and heating a cleaning pad with an ultrasonic bonding apparatus in order to bond upper and lower sides of the cleaning pad.

In the above method, some parts of the cleaning pad may be melted in compressing and heating the cleaning pad using the ultrasonic bonding apparatus, and the parts tend to stick to the surface of the bonding apparatus. Therefore the attached part of the cleaning pad is easily torn or damaged as the bonding apparatus moves up and down, which is the prime cause of poor quality in producing cleaning pads.

Further, in the above method, a straight blade is provided to move reciprocally in order to cut the bonded cleaning pad to be separated. However, when the cleaning pad is loosely laid, it is hard to cut the pad clearly, and so it may give rise to burs on the edge of the cut portion. Accordingly, to obtain pad having a sharp and clear cut section, it is necessary to tighten the cleaning pad to be stretched, which requires additional equipment. Moreover, since a cutting process is conducted during heating the cleaning pad, some melted pads are likely to stick to the blade when the moving speed of the blade is low.

SUMMARY OF THE INVENTION

The present invention is designed to solve the problems of the prior art, and therefore provides an apparatus for bonding and easily cutting a cleaning pad to which the cleaning pad does not stick when an ultrasonic horn moves after compressing and heating the cleaning pad.

The present invention provides an apparatus for manufacturing a cleaning pad comprising: a base, a pair of supply plates separated apart from each other by a predetermined distance and mounted over the base for supply of cleaning pad, a supporting plate protruded from an end of the supply plate, a lifting plate located on both side of the supporting plate to separate attached cleaning pad using pneumatic device, an ultrasonic horn with a groove in a bottom being vertically movable, located over the supporting plate and driven by an ultrasonic oscillator, an actuator mounted on both sides of the ultrasonic horn to help the ultrasonic horn separated from the cleaning pad, a moving body located right under the supporting plate and being reciprocally movable along a guide rail, a rotary blade mounted on a upper end of the moving body and being reciprocally movable in the groove of the ultrasonic horn, an air cylinder to make the moving body reciprocally moved, and an inhaler to draw off a broken piece of the cleaning pad generated by the rotary blade, wherein the actuator includes a case mounted on a side of the ultrasonic horn, a press member being vertically slidable in the case, a bottom of which is movable lower than that of the ultrasonic horn, and a spring located in the case to compress downward the press member.

The present invention is an apparatus of bonding and cutting a cleaning pad using an ultrasonic horn, which bonds opening ends of the cleaning pad with heat and pressure. A bonded portion of a high temperature tends to stick to peripheral devices, but the apparatus according to the present invention is likely to be easily separated from other devices due to an actuator and a lifting plate.

Also, the actuator acts as an additional compressor that compresses the cleaning pad in advance before the ultrasonic horn moves down. In addition, the actuator acts as a separator that compresses the cleaning pad for a while after the ultrasonic horn moves up to help separate the ultrasonic horn from the cleaning pad.

Further, the apparatus according to the present invention includes a rotary blade so that the cleaning pad needs not be tightened in cutting process, and also includes an inhaler to draw off the broken pieces of the cleaning pad material generated in cutting process.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE INVENTION

Hereinafter, preferred embodiments of the present invention will be described in detail with reference to the accompanying drawings.

Figure 1:
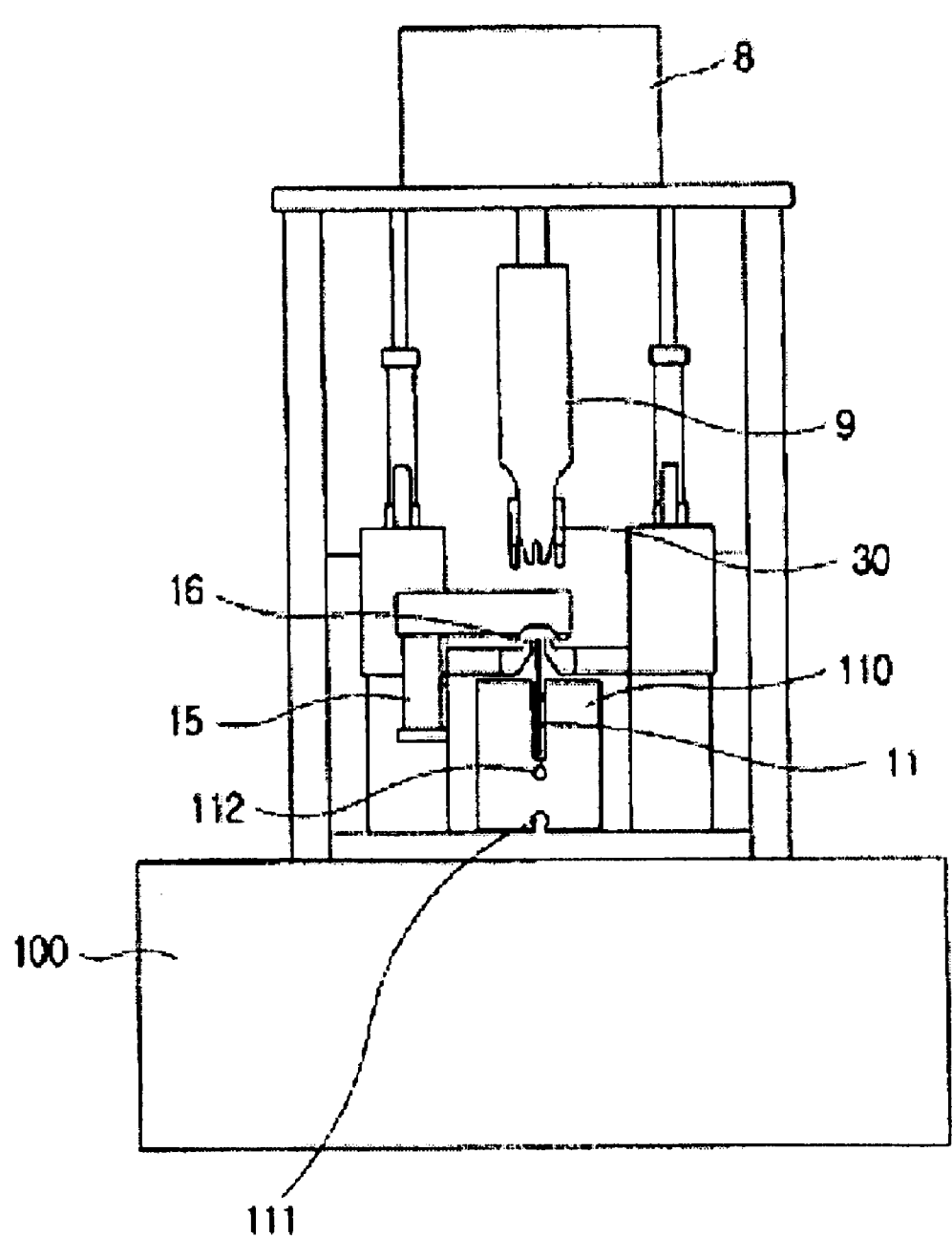
FIG. 1 is a front view of an apparatus in accordance with a preferred embodiment of the present invention.
Figure 2:
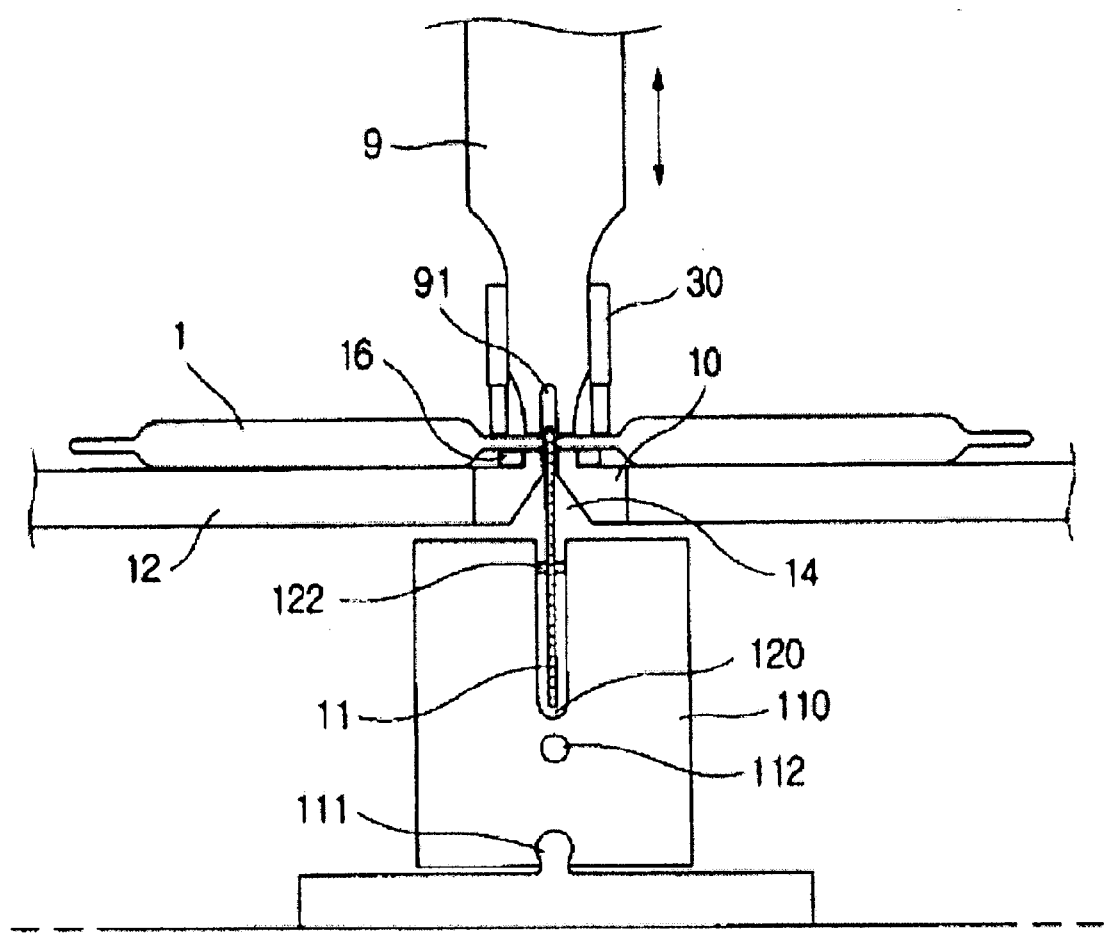
FIG. 2 is an enlarged view of a main part in FIG. 1.
Figure 3:
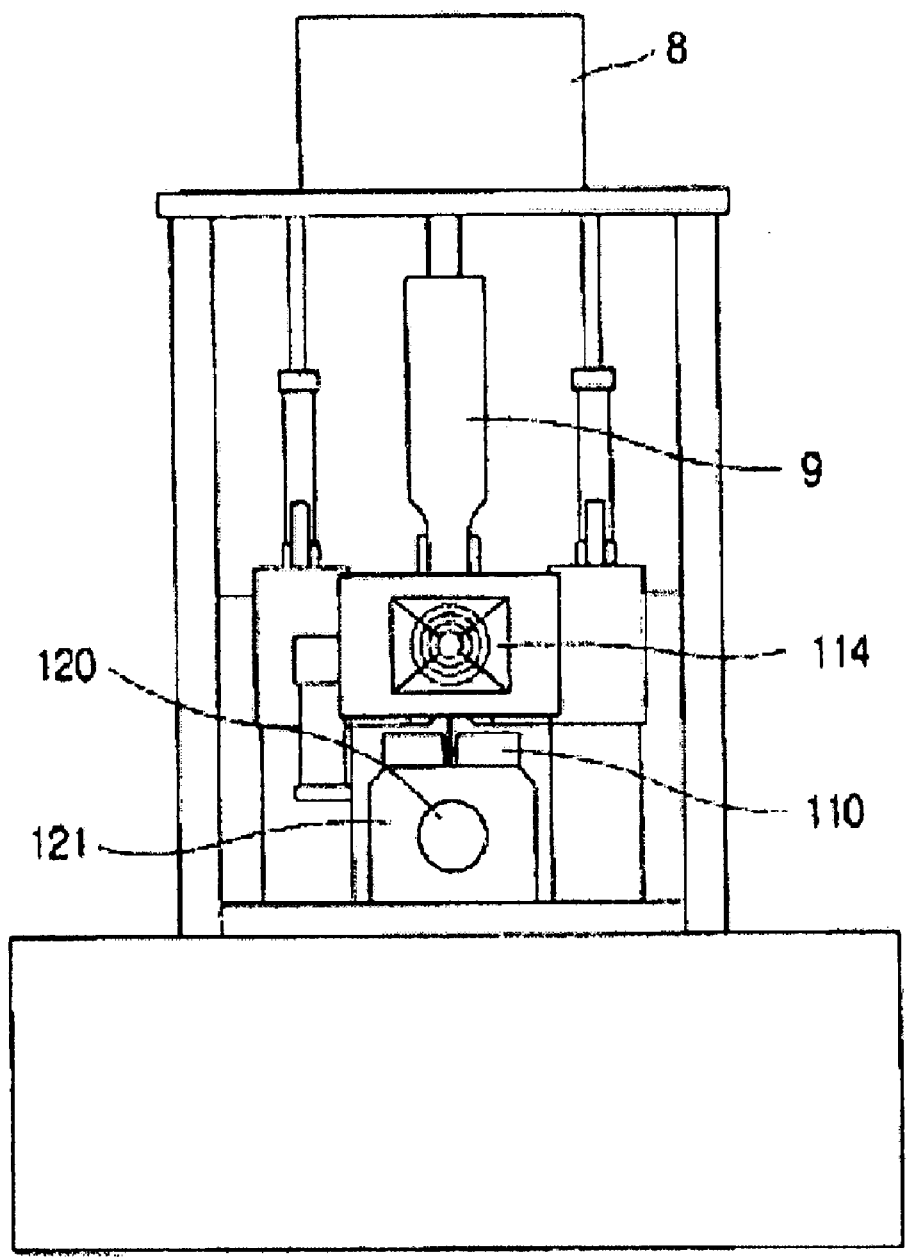
FIG. 3 is a rear view of the apparatus in FIG. 1.

FIGS. 1 to 3 show configuration of an apparatus of bonding and cutting cleaning pad in accordance with a preferred embodiment of this invention.

Referring to FIGS. 1 and 3, an apparatus of bonding and a cutting cleaning pad of this invention includes a base 100 and a pair of supply plates 12 positioned over the base 100. The supply plate 12 provides a place where a cleaning pad 1 is set. The supply plate 12 may include a feed device such as a conveyer and the like and preferably the cleaning pad 1 is provided continuously.

The cleaning pad 1 is comprised of a cover formed of polyester film and synthetic fiber having ad open space at an interior thereof and a long sponge made of synthetic fiber such as polyurethane fiber inserted into the space.

The supply plate 12 is positioned in the direction of feeding the cleaning pad and includes a supporting plate 10 protruded from ends of the supply plate 12. The supporting plate 10 has an upper surface opposing to an ultrasonic horn 9. The supporting plate 10 is located separated apart from each other and a rotary blade that will be described below is positioned between the supporting plates.

A pair of lifting plates 16 is mounted on both sides of the supporting plate 10 respectively, and is driven by a pneumatic device 15. The lifting plate 16 is positioned under a boundary of a bonded and cut portion of the cleaning pad 1 for lifting up the cleaning pad 1 so as to detach ends of the cleaning pad 1 from the supporting plate 10.

The ultrasonic horn 9 is located over the supporting plate 10, mounted vertically movable, and is connected with an ultrasonic oscillator 8 for providing ultrasonic waves that heats the cleaning pad 1 and makes the cover welded together.

A pair of protrusion is formed on a lower end of the ultrasonic horn 9, and this lower end faces to the upper end of the supporting plate 10 when the ultrasonic horn 9 moves downward. Therefore, if the ultrasonic horn 9 is moved down to the cleaning pad 1, the upper and lower ends of the cleaning pad 1 are compressed between the ultrasonic horn 9 and the supporting plate 10.

Also a recess 91 is formed within the ultrasonic horn 9 to a predetermined depth at the lower end, the recess 91 being a space into which a rotary blade 11 is partially inserted when the ultrasonic horn 9 moves down. Hence, the rotary blade 11 is able to move securely in cutting the cleaning pad 1.

An actuator 30 is mounted on both sides of the ultrasonic horn 9, respectively. The actuator 30 helps to separate the cleaning pad 1 from the lower end of the ultrasonic horn 9, as the ultrasonic horn 9 is lifted after completing the bonding and cutting process.

Figure 4:
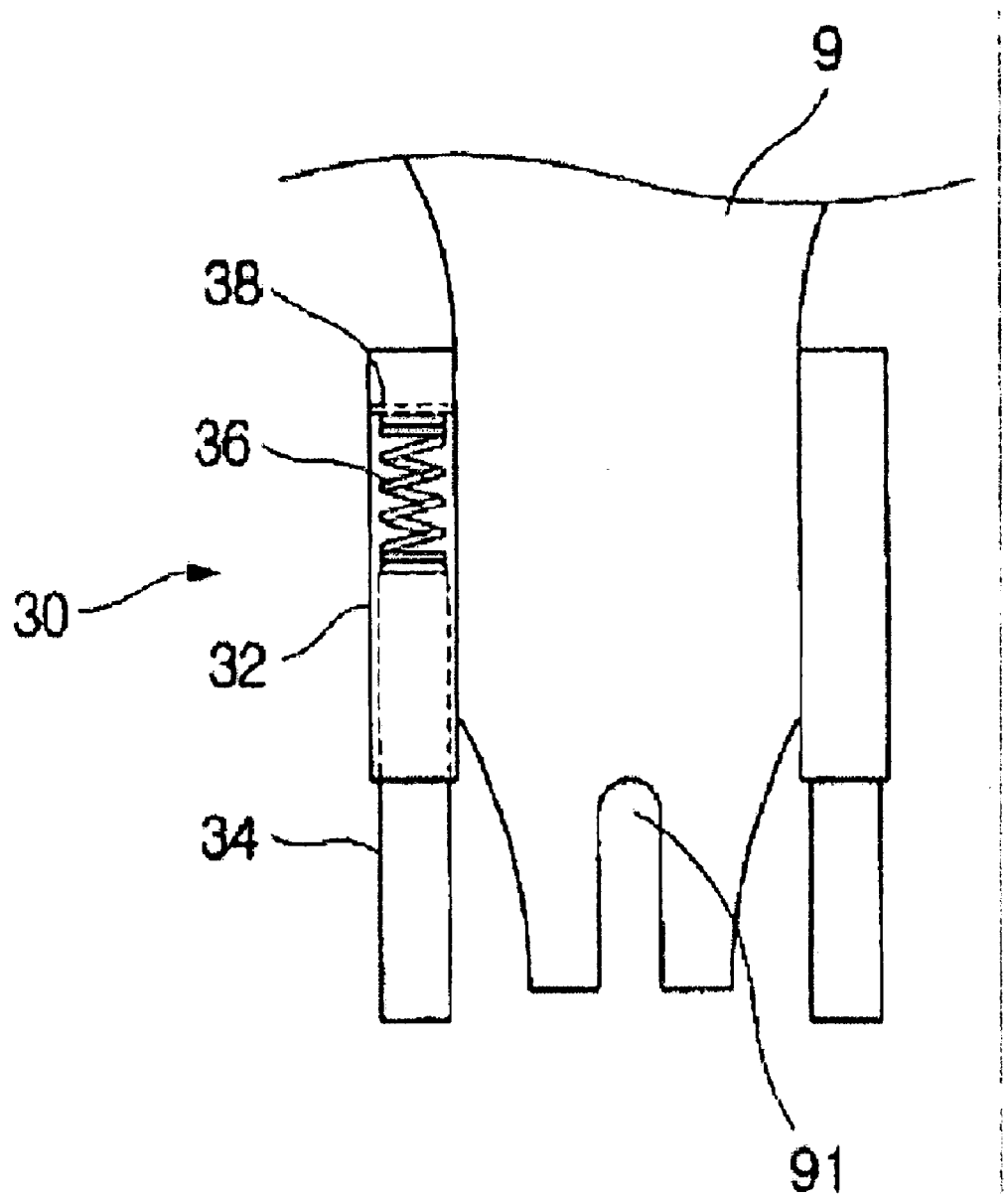
FIG. 4 is a detail drawing of the actuator in FIG. 1.

Referring to FIG. 4, the actuator 30 includes a case 32 mounted on the side of the ultrasonic horn 9. The lower end of the case 32 is located higher than the lower end of the ultrasonic horn 9.

A press member 34 is slidably mounted in the case 32, partially protruded from the case 32, and is vertically movable along the case 32. Moreover, a lower end of the case 32 can be lowered to a position lower than the end of the ultrasonic horn 9. The press member 34 is lowered to make the cleaning pad 1 tightened when the ultrasonic horn 9 is lowered. Also, the press member 34 is lifted up shortly after the ultrasonic horn 9 is lifted up. Therefore, the press member 34 compresses the cleaning pad 1 by the force of a spring 36, which makes the lower end of the ultrasonic horn 9 easily separated from the cleaning pad 1. The upper end of the spring 36 is fixed on a frame 38 formed in one body with the case 32, and the lower end of the spring 36 is connected with the upper end of the press member 34. Hence, the spring 36 keeps press member 34 compressed downward. Therefore, with no extra external pressure, the lower end of the press member 34 is protruded to a lower position than that of the ultrasonic horn 9.

Referring FIGS. 1 and 2 again, a moving body 110 is mounted under the supporting plate 10. The moving body 110 is able to move reciprocally along the guide rail 111 provided perpendicular to the direction of feeding the cleaning pad. Also, an air cylinder rod 112 is connected between the moving body 110 and an air cylinder 120 shown in FIG. 3. The air cylinder 120 is fixed on a supporting block 121 shown in FIG. 3. Therefore, the air cylinder rod 112 is moved along a piston movement of the air cylinder 120 and the moving body 110 moves reciprocally.

The rotary blade 11 is installed to be inserted into a groove formed on the upper surface of the moving body 110. The reference numeral 122 is a combining unit by which a center of rotation of the rotary blade 11 is combined with the moving body 110. Therefore, the rotary blade 11 becomes partially protruded out of the moving body 110 to thereby cut the cleaning pad 1. And the protrusion of the rotary blade 11 is accepted by the recess 91 when the ultrasonic horn 9 is lowered. Also though it is not shown in figure, it is a matter of course that a rotation-driving device including a motor to rotate the rotary blade 11 is contained in the moving body 110.

Referring to FIG. 3 again, an inhaler 114 is mounted near the rotary blade 11. The inhaler 114 is used for drawing off broken pieces or chips of the cleaning pad generated in cutting process. In this process, the inhaler 114 also draws off warm air caused by the ultrasonic horn 9, thus providing a cooling effect.

The operation of the apparatus of bonding and cuffing cleaning pad in according to the invention is as follows.

First, the cleaning pad 1 is provided from a supply device and the ultrasonic horn 9 is positioned in the upper position. The cleaning pad 1 is fed on the supply plate 12 and supporting plate 10, and a portion to be cut is put in the center of the supporting plate 10.

When the cleaning pad 1 reaches a proper position, the ultrasonic horn 9 is moved downward. The actuator 30 contacts the cleaning pad 1 via the press member 34 before the ultrasonic horn 9 contacts the cleaning pad 1.

As the ultrasonic horn 9 moves down, the press member 34 retracts into the case 32, compressing the spring 36. As the press member 34 retracts into the case 32 deeply, the compressive force of the spring 36 against the cleaning pad 1 becomes stronger. Then, the lower end of the ultrasonic horn 9 contacts and compresses the cleaning pad 1.

When the ultrasonic horn 9 and the actuator 30 compress the cleaning pad 1, the ultrasonic oscillator 8 starts operating and provides ultrasonic waves to the cleaning pad 1 through the ultrasonic horn 9. The ultrasonic waves heat a specific portion of the cleaning pad 1, particularly a portion that the ultrasonic horn 9 and the supporting plate 10 compress, thus bonding the cleaning pad 1 by the heat and pressure.

Then, as the air cylinder 120 is driven, the moving body 110 starts reciprocation and the rotary blade 11 is driven to rotate simultaneously.

The rotary blade 11 moves to cut the bonded portion of the cleaning pad 1 with the reciprocation of the moving body 110. Also, the broken pieces or chips of the cleaning pad 1 generated in this cutting process are drawn off through the inhaler 114.

After the cleaning pad 1 is bonded and cut, the rotary blade 11 and the moving body 110 stop moving and the ultrasonic horn 9 is lifted up. At this time, the press member 34 of the actuator 30 is compressed downward by the spring 36, therefore maintaining compression of the cleaning pad 1 as the ultrasonic horn 9 is moved upward. Hence, due to the compressing force of the press member 34, the lower end of the ultrasonic horn 9 is easily separated from the bonded portion of the cleaning pad 1.

That is, the cleaning pad 1 is held in place on the supply and supporting plates 10 and 12, respectively, by the actuator 30, even as the ultrasonic horn 9 is withdrawing from the pad 1. Accordingly, the ultrasonic horn quickly, cleanly, and easily separates from the recently bonded and cut cleaning pad 1.

As the ultrasonic horn 9 moves upward steadily, the press member 34 is gradually exposed. But finally the press member 34 is lifted up along the ultrasonic horn 9.

Then, the pneumatic device 15 located on both sides of the supporting plate 10 works to lift up the lifting plate 16, which makes the bonded portion of the cleaning pad 1 easily separated from the supporting plate 10.

After the cleaning pad 1 is separated from the supporting plate 10, the cleaning pads in a regular size are obtained and completed through the finishing process.

The apparatus of manufacturing cleaning pads according to the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for manufacturing a cleaning pad comprising:
   a base;
   a pair of supply plates separated from each other by a predetermined distance and mounted over the base for supply of the cleaning pad;
   a supporting plate protruded from an end of the supply plate;
   a lifting plate located on both sides of the supporting plate to separate the attached cleaning pad using a pneumatic device;
   an ultrasonic horn with a groove formed in a bottom being vertically movable, located over the supporting plate and driven by an ultrasonic oscillator;
   an actuator mounted on both sides of the ultrasonic horn to help the ultrasonic horn separate from the cleaning pad;
   a moving body located under the supporting plate and being movable along a guide rail;
   a rotary blade mounted on an upper end of the moving body and being movable in the groove of the ultrasonic horn;
   an air cylinder for moving the moving body; and
   an inhaler to draw off broken pieces of the cleaning pad generated by the rotary blade; wherein the actuator includes a case mounted on a side of the ultrasonic horn, a press member being vertically slidable in the case, a bottom of which is movable lower than that of the ultrasonic horn, and a spring located in the case to downwardly compress the press member.

2. An apparatus for manufacturing a cleaning pad, comprising:
   a base;
   a surface formed on the base for receiving and supporting the cleaning pad;
   an ultrasonic device for producing ultrasonic waves mounted on the base being movable with respect to the surface;
   an actuator disposed on the ultrasonic device being movable with respect to the ultrasonic device;
   a rotary blade disposed on the base being movable with respect to the surface;
   wherein, when the ultrasonic device is moved toward the first surface, the actuator contacts the cleaning pad and compresses the cleaning pad to the first surface prior to the ultrasonic device contacting the cleaning pad, and wherein, when the ultrasonic device is moved away from the first surface after contacting the cleaning pad, the actuator continues to contact and compress the cleaning pad.

3. The apparatus of claim 2, wherein the rotary cutting blade is movable toward the first surface so as to cut the cleaning pad.

4. The apparatus of claim 3, further comprising a lifting plate for separating the cleaning pad after being cut by the cutting blade, wherein the lifting plate is pneumatically driven.

5. The apparatus of claim 2, wherein the actuator comprises a case, a press member disposed in the case, the press member being vertically slidable within the case, and a spring member disposed in the case to downwardly compress the press member, wherein the press member is extendable to a point outside the case lower than a lower end of the ultrasonic device.

* * * * *